(12) United States Patent
Jeon et al.

(10) Patent No.: US 11,243,536 B2
(45) Date of Patent: Feb. 8, 2022

(54) VEHICULAR ELECTRONIC DEVICE AND OPERATION METHOD THEREOF

(71) Applicant: LG ELECTRONICS INC., Seoul (KR)

(72) Inventors: Byeongmoon Jeon, Seoul (KR); Yoonseong Soh, Seoul (KR); Jeongyeol Baek, Seoul (KR); Hyunjoo Ryu, Seoul (KR)

(73) Assignee: LG Electronics Inc., Seoul (KR)

( * ) Notice: Subject to any disclaimer, the term of this patent is extended or adjusted under 35 U.S.C. 154(b) by 107 days.

(21) Appl. No.: 16/490,496

(22) PCT Filed: Dec. 11, 2018

(86) PCT No.: PCT/KR2018/015642
§ 371 (c)(1),
(2) Date: Aug. 30, 2019

(87) PCT Pub. No.: WO2019/117572
PCT Pub. Date: Jun. 20, 2019

(65) Prior Publication Data
US 2020/0012282 A1    Jan. 9, 2020

Related U.S. Application Data

(60) Provisional application No. 62/597,219, filed on Dec. 11, 2017.

(51) Int. Cl.
| | |
|---|---|
| *G05D 1/02* | (2020.01) |
| *B60W 30/14* | (2006.01) |
| *B60W 40/02* | (2006.01) |
| *G06T 7/70* | (2017.01) |

(52) U.S. Cl.
CPC ............... *G05D 1/02* (2013.01); *B60W 30/14* (2013.01); *B60W 40/02* (2013.01); *G06T 7/70* (2017.01)

(58) Field of Classification Search
CPC ........ G05D 1/02; B60W 30/14; B60W 40/02; G06T 7/70
See application file for complete search history.

(56) References Cited

U.S. PATENT DOCUMENTS

| | | | |
|---|---|---|---|
| 10,395,144 B2 * | 8/2019 | Zeng | G05D 1/0088 |
| 10,853,449 B1 * | 12/2020 | Nguyen | G16H 15/00 |
| 2018/0373942 A1 * | 12/2018 | Noda | G06N 3/02 |

OTHER PUBLICATIONS

Designing deep convolutional neural networks for continuous object orientation estimation, Feb. 6, 2017 (Year: 2017).*

* cited by examiner

*Primary Examiner* — Jeff A Burke
*Assistant Examiner* — Mohamad O El Sayah
(74) *Attorney, Agent, or Firm* — Fish & Richardson P.C.

(57) ABSTRACT

Disclosed is an operation method of a vehicular electronic device, including receiving at least one image data from at least one camera installed in a vehicle, by at least one processor, generating a common feature map based on the image data using a convolutional neural network (CNN), by the at least one processor, and providing the common feature map to each of an object detection network, a bottom network, and a three dimensional network, by the at least one processor.

18 Claims, 12 Drawing Sheets

VEHICULAR ELECTRONIC DEVICE AND OPERATION METHOD THEREOF

CROSS-REFERENCE TO RELATED APPLICATIONS

This application is a National Phase application under 35 U.S.C. § 371 of International Application No. PCT/KR/2018/015642, filed on Dec. 11, 2018, which claims the benefit of U.S. Provisional Application No. 62/597,219, filed on Dec. 11, 2017, the entire disclosures of which are incorporated herein by reference.

TECHNICAL FIELD

The present invention relates to a vehicular electronic device, and an operation method and system of the vehicular electronic device.

BACKGROUND ART

A vehicle is an apparatus that is moved in a desired direction by a user who rides therein.

To increase the convenience of vehicle users, a vehicle is equipped with various sensors and electronic devices. Especially, an advanced driver assistance system (ADAS) and an autonomous vehicle are under active study to increase the driving convenience of users.

In order to embody an ADAS or an autonomous vehicle, a vehicle may include a plurality of cameras. In this case, each camera has a viewing angle and resolution appropriate for a target function. For example, a vehicle may include an around view monitoring (AVM) camera for providing an around view and a camera for detection of a forward object.

A conventional AVM is used to check a surrounding of a vehicle through an image while a driver drives the vehicle, but recently, an AVM has applied various image processing algorithms to function as a sensor for autonomous driving of a vehicle. In order to function as a sensor for autonomous driving, there is a need for technology of deriving an accurate result value with more rapid computing and a low computing load.

DISCLOSURE

Technical Problem

It is an object of the present invention to provide an operation of a vehicular electronic device for embodying various functions for autonomous driving based on a received image.

It is another object of the present invention to provide a vehicular electronic device for embodying various functions for autonomous driving based on a received image.

The technical problems solved by the embodiments are not limited to the above technical problems and other technical problems which are not described herein will become apparent to those skilled in the art from the following description.

Technical Solution

In accordance with the present invention, the above and other objects can be accomplished by the provision of an operation method of a vehicular electronic device, the method including receiving at least one image data from at least one camera installed in a vehicle, by at least one processor, generating a common feature map based on the image data using a convolutional neural network (CNN), by the at least one processor, and providing the common feature map to each of an object detection network, a bottom network, and a three dimensional network, by the at least one processor.

The CNN may include a plurality of convolutional layers and at least one pooling layer.

The method may further include extracting a first feature map for detecting an object based on the common feature map using the object detection network, by the at least one processor.

The method may further include predicting a bounding box of the object based on the first feature map, by the at least one processor, and predicting a type of the object based on the first feature map, by the at least one processor.

The method may further include extracting a second feature map for detecting a bottom based on the common feature map using the bottom network, by the at least one processor.

The method may further include performing upsampling on the second feature map, by the at least one processor, and predicting a free space and a bottom point of the object based on the upsampled second feature map, by the at least one processor.

The method may further include extracting a third feature map for estimating 3D information based on the common feature map using the 3D network, by the at least one processor.

The method may further include acquiring a 3D dimension of the object by applying a fully connected layer to the third feature map, by the at least one processor.

The method may further include acquiring a plurality of discrete orientations of the object based on the third feature map, by the at least one processor, and acquiring continuous orientation of the object by performing mean shift on the plurality of discrete orientations, by the at least one processor.

The method may further include estimating a first distance value with the object through a first output value of the object detection network and a second output value of the bottom network, by the at least one processor.

The method may further include estimating a second distance value with the object through a third output value of the 3D network, by the at least one processor.

The method may further include comparing the first distance value with the second distance value, by the at least one processor, and providing the first distance value when a difference between the first distance value and the second distance value is equal to or greater than a threshold value, by the at least one processor.

The comparing may include comparing a size of a 2D bounding box of the object as a combination of the first output value and the second output value with a size of a 3D cube as an output value of a network for estimating the 3D information and comparing the first distance value with the second distance value, by the at least one processor.

In accordance with another aspect of the present invention, there is provided a vehicular electronic device including at least one interface unit configured to exchange a signal with at least one camera installed in a vehicle, and at least one processor configured to receive at least one image data from the camera, to generate a common feature map based on the image data using a convolutional neural network (CNN), and to provide the common feature map to each of an object detection network, a bottom network, and a three dimensional network.

The CNN may include a plurality of convolutional layers and at least one pooling layer.

The processor may extract a first feature map for detecting an object based on the common feature map using the object detection network, may predict a bounding box of the object based on the first feature map, and may predict a type of the object based on the first feature map.

The processor may extract a second feature map for detecting a bottom based on the common feature map using the bottom network, may perform upsampling on the second feature map, and may predict a free space and a bottom point of the object based on the upsampled second feature map.

The processor may extract a third feature map for estimating 3D information based on the common feature map using the 3D network, may acquire a 3D dimension of the object by applying a fully connected layer to the third feature map, acquire a plurality of discrete orientations of the object based on the third feature map, and may acquire continuous orientation of the object by performing mean shift on the plurality of discrete orientations.

The processor may estimate a first distance value with the object through a first output value of the object detection network and a second output value of the bottom network, may estimate a second distance value with the object through a third output value of the 3D network, may compare a size of a 2D bounding box of the object as a combination of the first output value and the second output value with a size of a 3D cube as an output value of the 3D network and compares the first distance value with the second distance value, and may provide the first distance value when a difference between the first distance value and the second distance value is equal to or greater than a threshold value.

Details of other embodiments are included in a detailed description and drawings.

Advantageous Effects

According to the above technical solution, the present invention may provide one or more of the following effects.

First, a common feature map may be generated using a conventional neural network (CNN), and thus when various data for autonomous driving is acquired, computing load may be reduced.

Second, a CNN, an object detection network, a bottom network, and a 3D network may be used, thereby deriving an accurate result value.

Third, distance values with an object may be derived and selectively used through a plurality of networks, thereby ensuring accurate data.

The effects of the present invention are not limited to the above-described effects and other effects which are not described herein may be derived by those skilled in the art from the following description of the embodiments of the disclosure.

BEST MODE

Reference will now be made in detail to the exemplary embodiments of the present invention, examples of which are illustrated in the accompanying drawings. The suffixes "module" and "unit" of elements herein are used for convenience of description and thus can be used interchangeably, and do not have any distinguishable meanings or functions. In the following description of the at least one embodiment, a detailed description of known functions and configurations incorporated herein will be omitted for the purpose of clarity and for brevity. The features of the present invention will be more clearly understood from the accompanying drawings and should not be limited by the accompanying drawings, and it is to be appreciated that all changes, equivalents, and substitutes that do not depart from the spirit and technical scope of the present invention are encompassed in the present invention.

It will be understood that, although the terms "first", "second", "third" etc. may be used herein to describe various elements, these elements should not be limited by these terms. These terms are only used to distinguish one element from another element.

It will be understood that when an element is referred to as being "on", "connected to" or "coupled to" another element, it may be directly on, connected or coupled to the other element, or intervening elements may be present. In contrast, when an element is referred to as being "directly on," "directly connected to" or "directly coupled to" another element or layer, there are no intervening elements present.

The singular expressions in the present specification include the plural expressions unless clearly specified otherwise in context.

It will be further understood that the terms "comprises" or "comprising" when used in this specification specify the presence of stated features, integers, steps, operations, elements, or components, but do not preclude the presence or addition of one or more other features, integers, steps, operations, elements, components, or groups thereof.

In the following description, a left side of a vehicle refers to a left side of a traveling direction of the vehicle, and a right side of the vehicle refers to a right side of the traveling direction of the vehicle.

Figure 1:
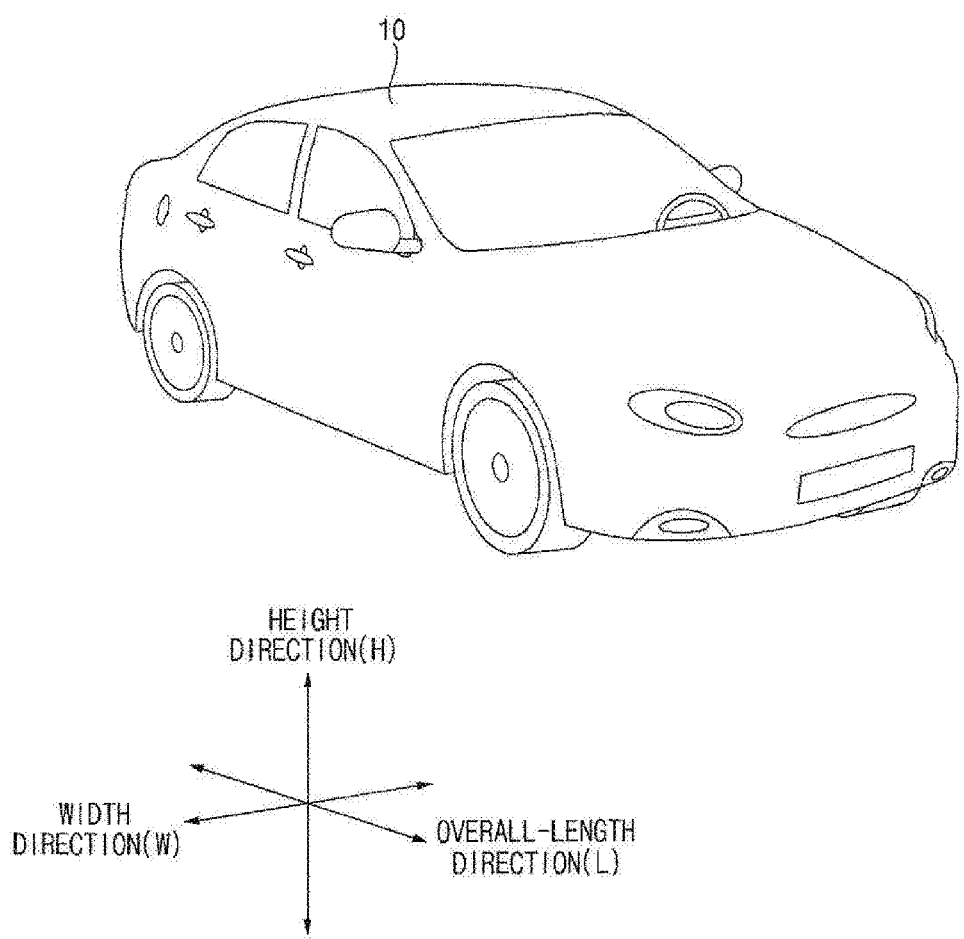
FIG. 1 is a diagram showing an outer appearance of a vehicle according to an embodiment of the present invention.
Figure 2:
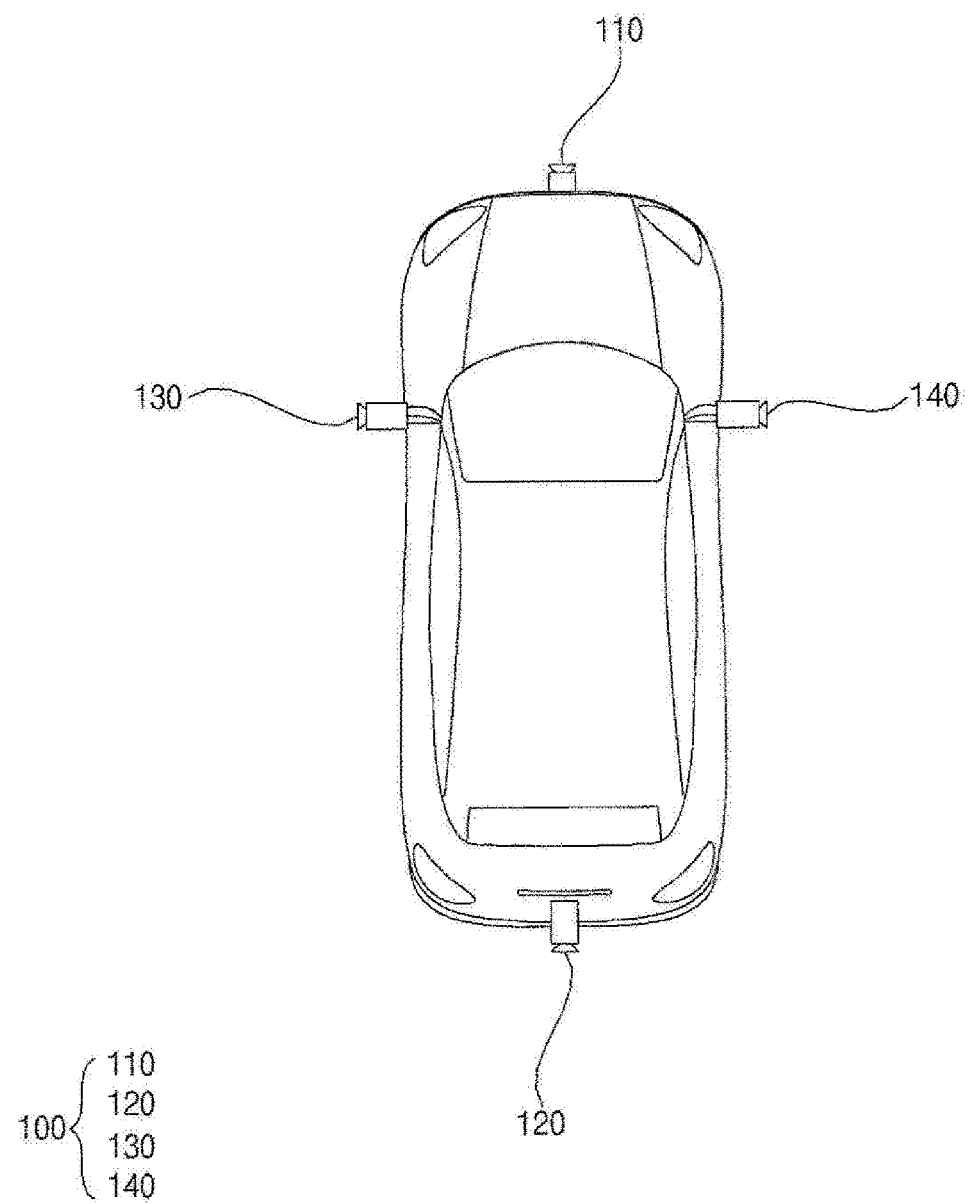
FIG. 2 is a diagram for explanation of a plurality of cameras included in an apparatus for providing an around view for a vehicle according to an embodiment of the present invention.
Figure 3:
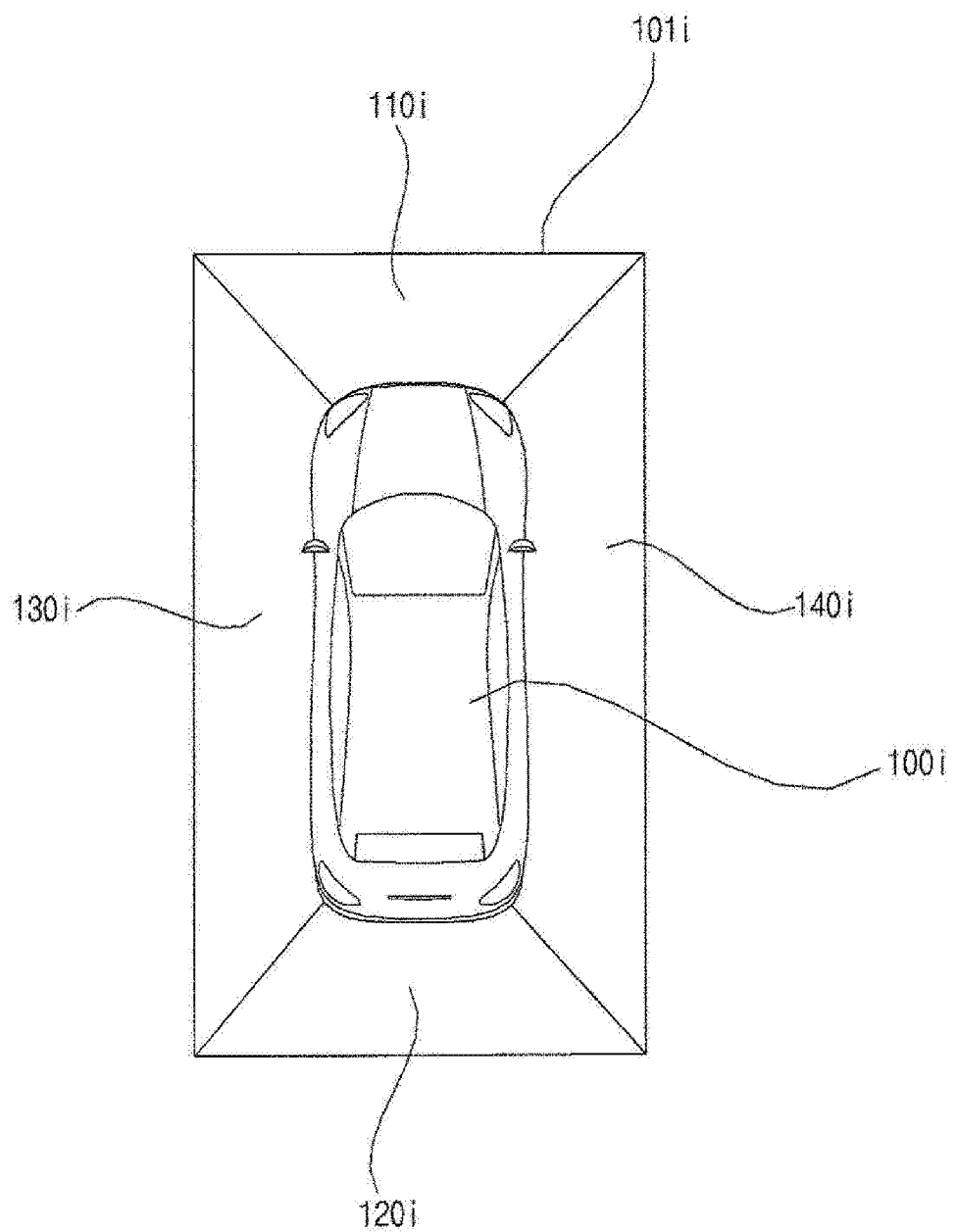
FIG. 3 is a diagram showing an example of an around view image generated by an apparatus for providing an around view for a vehicle according to an embodiment of the present invention.

FIG. 1 is a diagram showing a vehicle that travels on a road according to an embodiment of the present invention. FIG. 2 is a diagram for explanation of a plurality of cameras included in an apparatus for providing an around view for a vehicle according to an embodiment of the present invention. FIG. 3 is a diagram showing an example of an around view image generated by an apparatus for providing an around view for a vehicle according to an embodiment of the present invention.

Referring to FIG. 1, a vehicle 10 according to an embodiment of the present invention may be defined as a transportation device that travels on a road or a railroad. The vehicle 10 may conceptually include an automobile, a train, and a motorcycle. The vehicle 10 may include an autonomous vehicle that travels without traveling manipulation of a driver or an advanced driver assistance system (ADAS). The vehicle 10 may conceptually include a vehicle equipped with an internal combustion engine as a power source, a hybrid vehicle equipped with both an engine and an electric motor as a power source, and an electric vehicle equipped with an electric motor as a power source.

The vehicle 10 may include at least one camera 100 and an electronic device 200. In some embodiments, the camera 100 may be classified as a low-ranking component of the electronic device 200.

The vehicle 10 may further include a user interface (UI) device, an object detection device, a communication device, a driving manipulation device, a main electronic control unit (ECU), a vehicle driving device, a traveling system, a sensing unit, a position data generating device, or the like.

The UI device may be used to enable the vehicle 10 to communicate with a user. The UI device may receive a user input, and may provide information generated from the vehicle 10 to the user. The vehicle 10 may implement UIs or User Experience (UX) through the UI device.

The object detection device may detect an object outside the vehicle 10. The object detection device may include at least one of a camera, radio detecting and ranging (radar), light detection and ranging (LiDAR), an ultrasonic sensor, or an infrared sensor. The object detection device may provide data of an object, which is generated based on a sensing signal generated by a sensor, to at least one electronic vehicle included in a vehicle.

The object detection device may generate dynamic data based on a sensing signal of an object. The object detection device may provide the dynamic data to the electronic device 200.

The communication device may exchanges signals with a device positioned outside the vehicle 10. The communication device may exchange a signal with at least one of an infrastructure (e.g., a server or a broadcast station) or other vehicles. The communication device may include at least one of a transmission antenna, a reception antenna, a radio frequency (RF) circuit for implementing various communication protocols, or an RF device in order to perform communication The driving manipulation device may be used to receive a user command for driving the vehicle 10. In the manual mode, the vehicle 10 may travel based on a signal provided by the driving manipulation device. The driving manipulation device may include a steering input device (e.g., a steering wheel), an acceleration input device (e.g., an acceleration pedal), and a brake input device (e.g., a brake pedal).

The main electronic control unit (ECU) may control an overall operation of at least one electronic device included inside the vehicle 10.

The vehicle driving device is a device for electrically control various devices inside the vehicle 10. The vehicle driving device may include a power train driving unit, a chassis driving unit, a door/window driving unit, a safety device driving unit, a lamp driving unit, and an air conditioner driving unit. The power train driving unit may include a power source driver and a transmission driver. The chassis driving unit may include a steering driver, a brake driver, and a suspension driver.

The traveling system may perform a traveling operation of the vehicle 10. The traveling system may provide a control signal to at least one of a powertrain driving unit or a chassis driving unit of the vehicle driving device and may move the vehicle 10.

The traveling system may include at least one of an ADAS application or an autonomous application. The traveling system may generate a traveling control signal using at least one of an ADAS application or an autonomous driving application.

The sensing unit may sense a vehicle state. The sensing unit may include at least one of an inertial navigation unit (IMU) sensor, a collision sensor, a wheel sensor, a speed sensor, an inclination sensor, a weight detection sensor, a heading sensor, a position module, a vehicle drive/reverse sensor, a battery sensor, a fuel sensor, a tier sensor, a steering sensor for rotation of the steering wheel, an in-vehicle temperature sensor, an in-vehicle humidity sensor, an ultrasonic sensor, an illuminance sensor, an acceleration pedal position sensor, or a brake pedal position sensor. The inertial navigation unit (IMU) sensor may include one or more of an acceleration sensor, a gyro sensor, and a magnetic sensor.

The sensing unit may generate state data of a vehicle based on a signal generated by at least one sensor. The sensing unit acquire a sensing signal of vehicle position information, vehicle motion information, vehicle yaw information, vehicle roll information, vehicle pitch information, vehicle collision information, vehicle heading information, vehicle angle information, vehicle speed information, vehicle acceleration information, vehicle inclination information, vehicle drive/reverse information, battery information, fuel information, wheel information, vehicle lamp information, vehicle internal temperature information, vehicle internal humidity information, a steering wheel rotation angle, a vehicle external illuminance, a pressure applied to an accelerator pedal, a pressure applied to a brake pedal, and so on.

The sensing unit may further include an accelerator pedal sensor, a pressure sensor, an engine speed sensor, an air flow sensor (AFS), an air temperature sensor (ATS), a water temperature sensor (WTS), a throttle position sensor (TPS), a top dead center (TDC) sensor, a crank angle sensor (CAS), and so on.

The sensing unit may generate vehicle state information based on the sensing data. The vehicle state information may be generated based on data detected by various sensors included in the vehicle.

For example, the vehicle state information may include vehicle position information, vehicle speed information, vehicle inclination information, vehicle weight information, vehicle heading information, vehicle battery information, vehicle fuel information, vehicle wheel air pressure information, vehicle steering information, in-vehicle temperature information, in-vehicle humidity information, pedal position information, vehicle engine temperature information, and so on.

The position data generating device may generate position data of the vehicle 10. The position data generating device may include at least one of a global positioning system (GPS) or a differential global positioning system (DGPS). The position data generating device may generate position data of the vehicle 10 based on a signal generated by at least one of a GPS or a DGPS. In some embodiments, the position data generating device may correct the position data based on at least one of an inertial measurement unit (IMU) of the sensing unit or a camera of the object detection device 210.

The vehicle 10 may include an internal communication system 50. A plurality of electronic devices included in the vehicle 10 may exchange a signal using the internal communication system 50 as a medium. The signal may include data. The internal communication system 50 may use at least one communication protocol (e.g., CAN, LIN, FlexRay, MOST, or Ethernet).

Referring to FIG. 2, the vehicle 10 may include the at least one camera 100. For example, the vehicle 10 may include four cameras 110, 120, 130, and 140. In some embodiments, the vehicle 10 may include cameras, the number of which is less than 4 or is greater than 4.

The plurality of 110, 120, 130, and 140 may be attached to at least one of a moving part and a fixed part of a vehicle body. The moving part of the vehicle body refers to a moveable part among components of the vehicle body which forms an outer appearance and a frame of the vehicle. For example, the moving part of the vehicle body may include a side mirror, a door, a sunroof, a wiper, a bonnet (or a hood), a wheel, and a window. The fixed part of the vehicle body refers to a non-moveable part among components of the vehicle body which forms an outer appearance and a frame of the vehicle. For example, the fixed part of the vehicle body may include a bumper, grill, a fender, a wheel house, a roof, or a wind shield.

A plurality of cameras 100 may include a front camera 110, a rear camera 120, a left lateral camera 130, and a right lateral camera 140.

The front camera 110 may acquire a front image of the vehicle 10. The front camera 110 may be attached to a front bumper that is one of the fixed parts. The front camera 110 may be disposed inside the grill.

The rear camera 120 may acquire a rear image of the vehicle 10. The rear camera 120 may be attached to a back door that is one of the moving parts. The back door may include a trunk and a tail gate. The rear camera 120 may be attached to a rear bumper that is one of the fixed parts.

The left lateral camera 130 may acquire a left lateral image of the vehicle 10. The left lateral camera 130 may be attached to a left side mirror that is one of the moving parts. Here, the left side mirror may include a mirror, various electrical components, a case that surrounds the mirror and the electrical components, and the like. The left side mirror may be referred to as a left side mirror module. The left lateral camera 130 may be attached to a left front door that is one of the moving parts. The left front door may conceptually include a left side mirror.

The right lateral camera 140 may acquire a right lateral image of the vehicle 10. The right lateral camera 140 may be attached to a right side mirror that is one of the moving parts. Here, the right side mirror may include a mirror, various electrical components, a case that surrounds the mirror and the electrical component, or the like. The right side mirror may be referred to as a right side mirror module. The right lateral camera 140 may be attached to a right front door that is one of the moving parts. The right front door may conceptually include a right side mirror.

Referring to FIG. 3, the vehicular electronic device 200 may include an around view image 101$i$. A processor 270 of the vehicular electronic device 200 may receive at least one image data from the at least one camera 100 and may match the received image data to generate the around view image 101$i$. For example, the processor 270 of the vehicular electronic device 200 may a front image acquired by the front camera 110, a rear image acquired by the rear camera 120, a left image acquired by the left lateral camera 130, and a right lateral image acquired by the right lateral camera 140 to generate the around view image 101$i$. The around view image 101$i$ may include at least one of a top view image, a side view image, a front view image, or a back view image. The around view image 101$i$ may be embodied as a 2D or 3D image.

The around view image 101$i$ may include a borderline. The borderline may be a line for defining regions that respectively correspond to a plurality of images acquired by the at least one camera 100 from the around view image 101$i$.

The around view image 101$i$ may include a first region 110$i$, a second region 120$i$, a third region 130$i$, and a fourth region 140$i$. The first region 110$i$ may be a region corresponding to a front image. The second region 120$i$ may be a region corresponding to a rear image. The third region 130$i$ may be a region corresponding to a left image. The fourth region 140$i$ may be a region corresponding to a right lateral image. The around view image 101$i$ may include a vehicle image 100$i$ corresponding to the vehicle 10.

Figure 4:
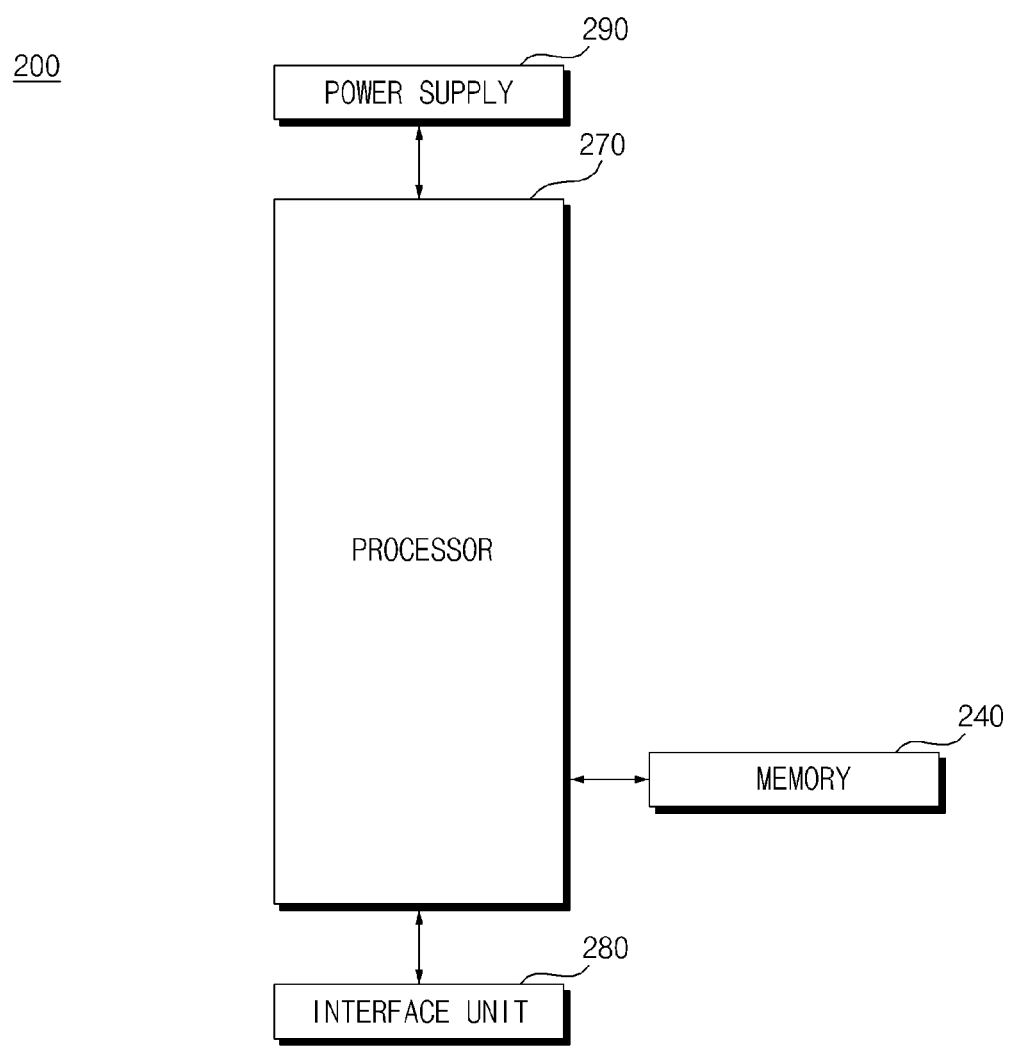
FIGS. 4 and 5 are block diagrams for explanation of a vehicular electronic device according to an embodiment of the present invention.
Figure 5:
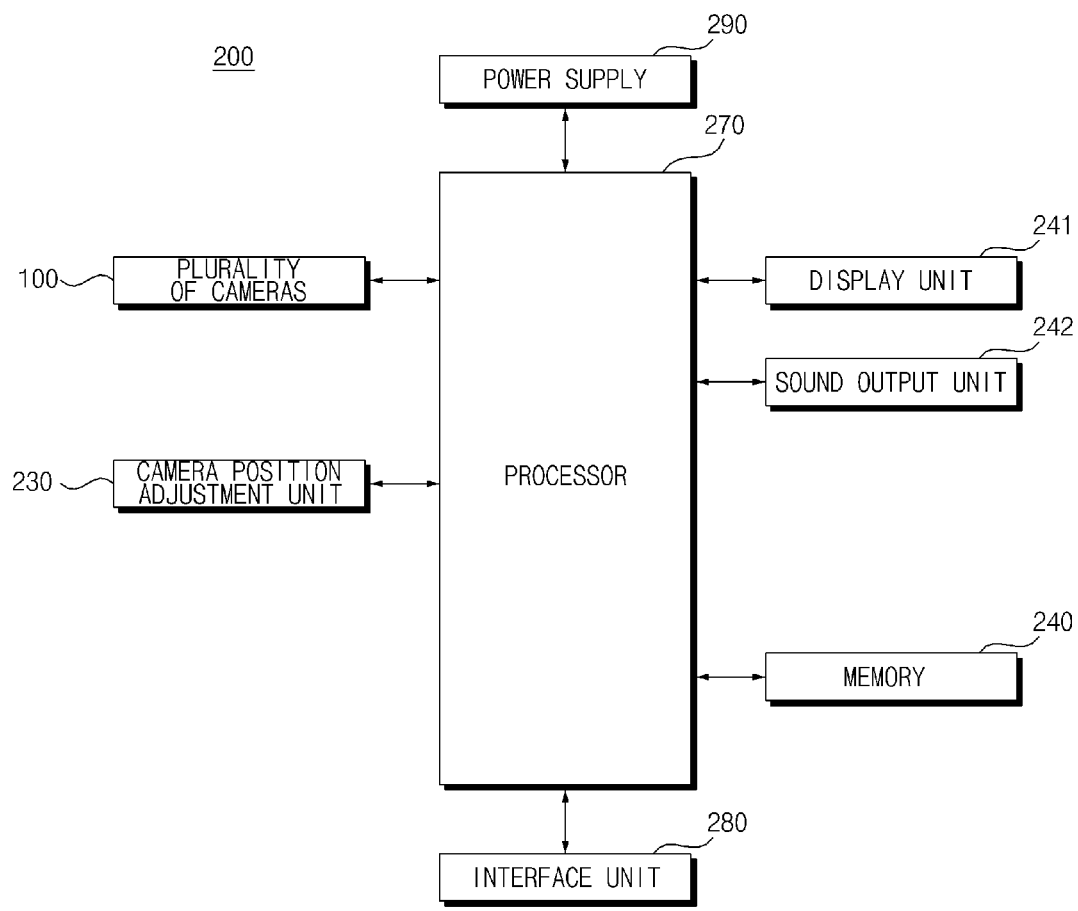

FIGS. 4 and 5 are block diagrams for explanation of a vehicular electronic device according to an embodiment of the present invention.

Referring to FIG. 4, the vehicular electronic device 200 may include at least one memory 240, at least one processor 270, at least one interface unit 280, and a power supply 290.

The memory 240 may be electrically connected to the processor 270. The memory 240 may store basic data of a predetermined unit, control data for control of an operation of a predetermined unit, and input and output data. The memory 240 may store data processed by the processor 270. The memory 240 may include at least one of ROM, RAM, EPROM, a flash drive, or a hard drive in terms of hardware. The memory 240 may store a program for processing or controlling the processor 270, or various data for an overall operation of the electronic device 200. The memory 240 may be integrated into the processor 270.

The processor 270 may be electrically connected to the interface unit 280, and the power supply 290 and may exchange signals with each other. The processor 270 may be embodied using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or an electrical unit for performing other functions. The processor 270 may be driven by power supplied from the power supply 290.

The processor 270 may receive at least one image data from the at least one camera 100 installed in the vehicle 10. The processor 270 may image-process the received image data.

The processor 270 may generate a public feature map based on image data using a convolutional neural network (CNN). For example, the processor 270 may generate the public feature map based on information on at least one of color, borderline, or contrast of an image using a convolutional neural network (CNN). The CNN may be a type of an artificial neural network using convolution computation. When convolution is used, data may be transmitted to a next layer while spatial information of 3D data is maintained. The CNN may include a plurality of convolutional layers and at least one pooling layer.

The processor 270 may provide a common feature map to each of an object detection network, a bottom network, and a three-dimensional (3D) network.

The object detection network may be defined as a network for generating information on an object of the outside of the vehicle 10. Object information may include information on whether an object is present, position information of an object, information on a distance between the vehicle 10 and an object, and information on relative speed between the vehicle 10 and an object. The object may be various objects related to driving of the vehicle 10. The object may be a lane, other vehicles, a pedestrian, a two-wheeled vehicle, a traffic signal, a construction, a speed bump, a geographical feature, an animal, or the like. The object detection network may receive a common feature map and may output a 2D bounding box of an object and type information of the object. The object detection network may use Faster R-CNN, nception-ResNet-V2, MobileNet, or the like. The processor 270 may extract a first feature map for detection of the object based on a common feature map using the object detection network. The processor 270 may extract the first feature map based on information on at least one of color, a borderline, or contrast of an image using the object detection network. The processor 270 may predict a bounding box of the object based on the first feature map. The processor 270 may predict a type of the object based on the first feature map. The bounding box may be represented in a shape of a square that surrounds the object in an image.

The bottom network may be defined as a network for prediction of a free space and a bottom point of the object. The free space may be defined as a space in which the vehicle 10 is moveable. The bottom point of the object may be defined as a point at which the object and a bottom surface contact each other. The bottom network may receive a common feature map and may output the free space and a bottom point of the object. The processor 270 may extract a second feature map for bottom detection based on the common feature map using a bottom network. The processor 270 may extract the second feature map based on at least one of color, a borderline, or contrast of an image using the bottom network. The processor 270 may perform upsampling on the second feature map. The processor 270 may predict a free space and a bottom point of the object based on the upsampled second feature map. In some embodiments, the processor 270 may predict a curb based on the upsampled second feature map.

The 3D network may be defined as a network for estimating 3D information of the object. The 3D network may receive a common feature map and may output a dimension of the object and orientation of the object. The processor 270 may extract a third feature map for estimating information on 3D information based on the common feature map using a 3D network. The processor 270 may extract the third feature map based on at least one of color, a borderline, or contrast of an image using the 3D network. The processor 270 may apply the third feature map to a fully connected layer to acquire a 3D dimension of the object. The processor 270 may acquire a plurality of discrete orientations of the object based on the third feature map. The processor 270 may perform mean shift on the plurality of discrete orientations to acquire a continuous orientation of the object.

The processor 270 may estimate a first distance value with the object through a first output value of the object detection network and a second output value of the bottom network. For example, the first output value may be a 2D bounding box and the second output value may be a bottom point of the object. The first distance value may be defined as a distance value with the object, detected based on a camera for generating image data, and image data.

The processor 270 may combine the object and the bottom point information to estimate the first distance value. In this case, the object and the bottom point information involve position information of an entire image, and thus the processor 270 may compare and match bottom point positions with the 2D bounding box in the detected object. The processor 270 may match a minimum bottom point within the bounding box of the detected object as a representative value.

The processor 270 may derive a distance between the vehicle 10 and the bottom point of the object via a trigonometric function scheme using bottom point information of the object and installation information of the camera (e.g., a distance to a camera from a ground surface or an angle of the camera). The distance between the vehicle 10 and the object may be a distance between a ground surface of the camera 100 and the bottom point of the object. The distance may be obtained using tangent of a distance H to the camera 100 from the ground surface and an angle B between a vertical line of the ground surface of the camera 100 and a straight line between the camera 100 and the object.

The object may include other vehicles, a pedestrian, and a two-wheeled vehicle.

A wheel of a vehicle is recognized as a bottom point, but an actual distance with a vehicle is a distance with a vehicle bumper, and thus a distance error occurs when a distance with the bottom point of the vehicle is computed. The processor 270 may subtract a distance between a bottom point of a wheel and a ground surface position of the vehicle bumper from a distance with a bottom point of a wheel of another vehicle to remove the error, and thus may compute an actual distance with the vehicle.

The bottom point of the pedestrian is substantially the closest position to the pedestrian, and thus a distance using the bottom point of the pedestrian may be a substantial distance of the pedestrian. With regard to the two-wheeled vehicle, an error in positions of a bottom point of the wheel and a bumper is not high, and thus an actual distance may be computed as a distance using the bottom point like the pedestrian.

A bottom point is present at each column of one object, and thus one object may have a plurality of bottom points. The processor 270 may acquire distances between a vehicle and a plurality of bottom points corresponding to the object and may recognize a minimum value among the distances as a distance between the vehicle 10 and the object.

A bumper of another vehicle is positioned apart from the ground, and thus a bottom point is not detected. In this case, the processor 270 may acquire a distance value with a bumper based on a third output value of a 3D network.

The processor 270 may estimate a second distance value with an object through the third output value of the 3D network. The second distance value may be defined as a distance value with an object detected based on image data and a camera configured to generate the image data.

The processor 270 may compare a size of a 2D bounding box of an object that is a combination of the first output value and the second output value with a size of a 3D cube that is an output value of the 3D network to compare the first distance value and the second distance value. The cube may be expressed by a hexahedron that surrounds the object in an image.

The processor 270 may compare the first distance value and the second distance value based on whether a difference between the size of the 2D bounding box and the size of the 3D cube is equal to or greater than a threshold value. Upon determining that the difference between the first distance value and the second distance value is equal to or greater than the threshold value, the processor 270 may disregard the second distance value and may provide the first distance value as a distance value between the vehicle 10 and the object.

The interface unit 280 may exchange signals with at least one electronic device included in the vehicle 10 in a wired or wireless manner. The interface unit 280 may exchange signals with at least one of a user interface device, an object detection device, a communication device, a driving manipulation device, a main ECU, a vehicle driving device, a traveling system, a sensing unit, or a position data generating device in a wired or wireless manner. The interface unit 280 may include at least one of a communication module, a terminal, a pin, a cable, a port, a circuit, an element, or a device.

The interface unit 280 may exchange signals with the at least one camera 100 installed in the vehicle 10. The interface unit 280 may receive image data from the at least one camera 100. For example, the interface unit 280 may receive front image data, rear image data, left side image data, and right side image data from the front camera 110, the rear camera 120, the left lateral camera 130, and the right lateral camera 140, respectively.

The power supply 290 may supply power to the electronic device 200. The power supply 290 may receive power from a power source (e.g., a battery) included in the vehicle 10 and may supply power to each unit of the electronic device 200. The power supply 290 may be operated according to a control signal provided from the main ECU. The power supply 290 may be embodied as a switched-mode power supply (SMPS).

The electronic device 200 may include at least one printed circuit board (PCB). The memory 240, the interface unit 280, the power supply 290, and the processor 270 may be electrically connected to the PCB.

Referring to FIG. 5, the vehicular electronic device 200 may include a combination of the at least one camera 100, a camera position adjustment unit 230, a display unit 241, and a sound output unit 242 or may separately include the same as well as the memory 240, the processor 270, the interface unit 280, the power supply 290.

The camera 100 has been described above with reference to FIGS. 1 to 3.

The camera position adjustment unit 230 may control a position of each of the cameras 100. The camera position adjustment unit 230 may include a plurality of drivers corresponding to the number of the cameras 100. Here, the driver may include a driving force generating unit such as a motor, an actuator, or a solenoid. For example, the camera position adjustment unit 230 may include a first driver corresponding to the front camera 110, a second driver corresponding to the rear camera 120, a third driver corresponding to the left lateral camera 130, and a fourth driver corresponding to the right lateral camera 140. The camera position adjustment unit 230 may adjust a position of a camera attached to a moving part based on movement information of the moving part according to control of the processor 270.

The display unit 241 may display a graphic object. The display unit 241 may display an around view image based on data provided by the processor 270.

The sound output unit 242 may output an audio signal. The sound output unit 242 may output the audio signal based on data provided by the processor 270.

Figure 6:
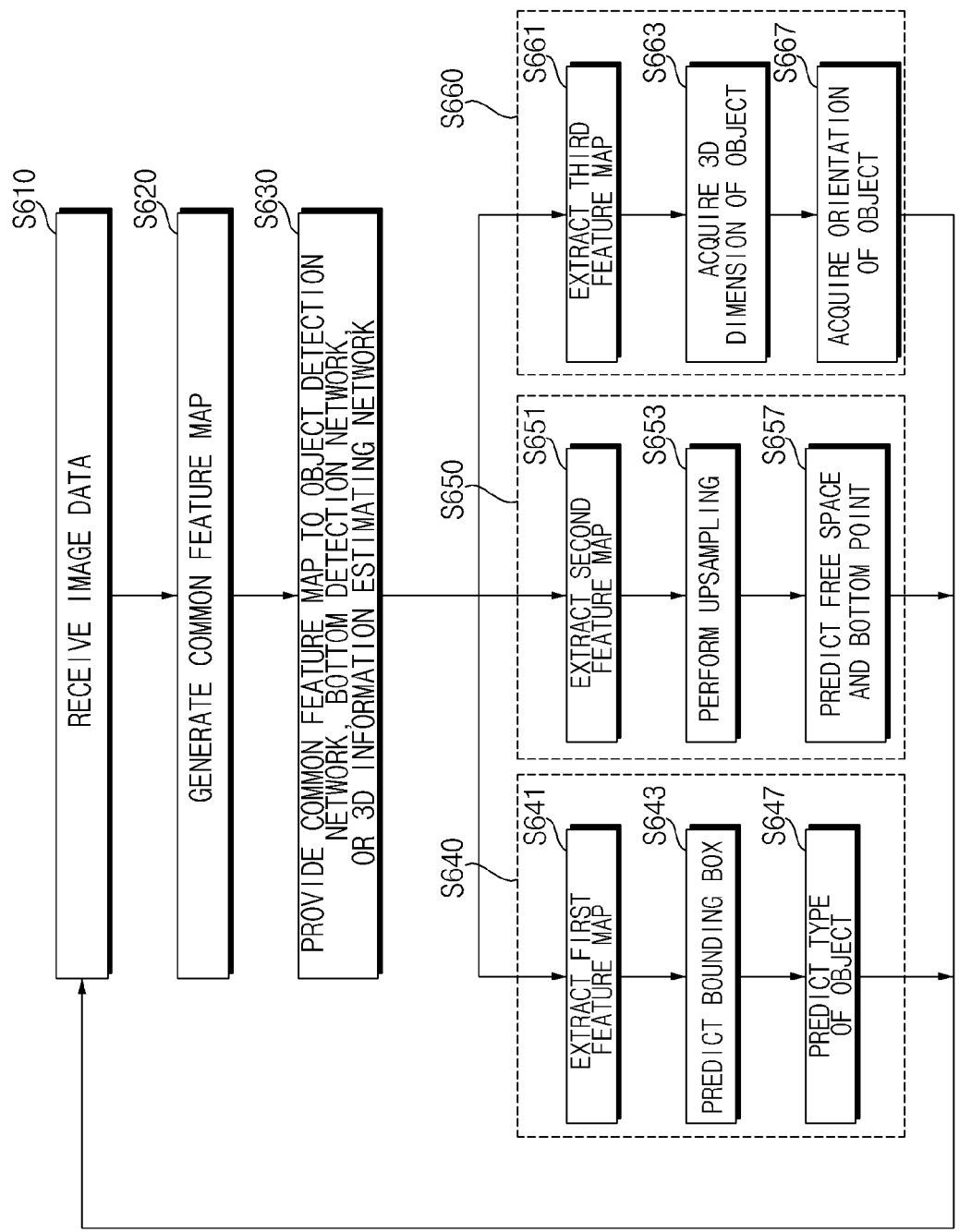
FIG. 6 is a flowchart for explanation of an operation method of a vehicular electronic device according to an embodiment of the present invention.

FIG. 6 is a flowchart for explanation of an operation method of a vehicular electronic device according to an embodiment of the present invention.

The processor 270 may receive at least one image data from the at least one camera 100 installed in the vehicle 10 (S610). The processor 270 may image-process the received image data.

The processor 270 may generate a common feature map (S620). The processor 270 may generate the common feature map based on the image data using a CNN. The CNN may include a plurality of convolutional layers and at least one pooling layer.

The processor 270 may provide the common feature map to each of an object detection network, a bottom network, and a three-dimensional network (S630).

Then, the processor 270 may perform an object detection operation S640, a bottom detection operation S650, and a 3D information estimation operation S660 in parallel. The object detection operation S640 may be embodied by an object detection network. The bottom detection operation S650 may be embodied by a bottom network. The 3D information estimation operation S660 may be embodied by a 3D network.

The processor 270 may extract a first feature map for detection of an object based on a common feature map using the object detection network (S641). The processor 270 may predict a bounding box of the object based on the first feature map (S643). The processor 270 may predict a type of the object based on the first feature map (S647).

The processor 270 may extract a second feature map for bottom detection based on the common feature map using the bottom network (S651). The processor 270 may perform upsampling on the second feature map (S653). The processor 270 may predict the free space and a bottom point of the object based on the upsampled second feature map (S657).

The processor 270 may extract a third feature map for estimation 3D information based on the common feature map using the 3D network (S661). The processor 270 may apply a fully connected layer to the third feature map to acquire a 3D dimension (S663). The processor 270 may acquire orientation of the object based on the third feature map (S667). The processor 270 may acquire a plurality of discrete orientations of the object based on the third feature map. The processor 270 may perform mean shift on a plurality of discrete orientations to acquire continuous orientation of the object.

The operation method of the vehicular electronic device may further include estimating a first distance value with the object through the first output value of the object detection network and the second output value of the bottom network by the processor 270. For example, the first output value may be a 2D bounding box and the second output value may be the bottom point of the object. The first distance value may be defined as a distance value of the object detected based on image data and a camera configured to generate the image data.

The operation method of the vehicular electronic device may further include the second distance value with the object through the third output value of the 3D network by the processor 270. The second distance value may be defined as a distance value with the object detected based on image data and a camera configured to generate the image data.

The operation method of the vehicular electronic device may further include comparing the first distance value with the second distance value by the processor 270, and when the difference between the first distance value and the second distance value is equal to or greater than a threshold value, providing the first distance value. In this case, the comparing may include comparing the size of the 2D bounding box for an object of a combination of the first output value and the second output value with a size of a 3D cube that is an output value of the 3D information estimating network and comparing the first distance value with the second distance value by the processor.

Figure 7:
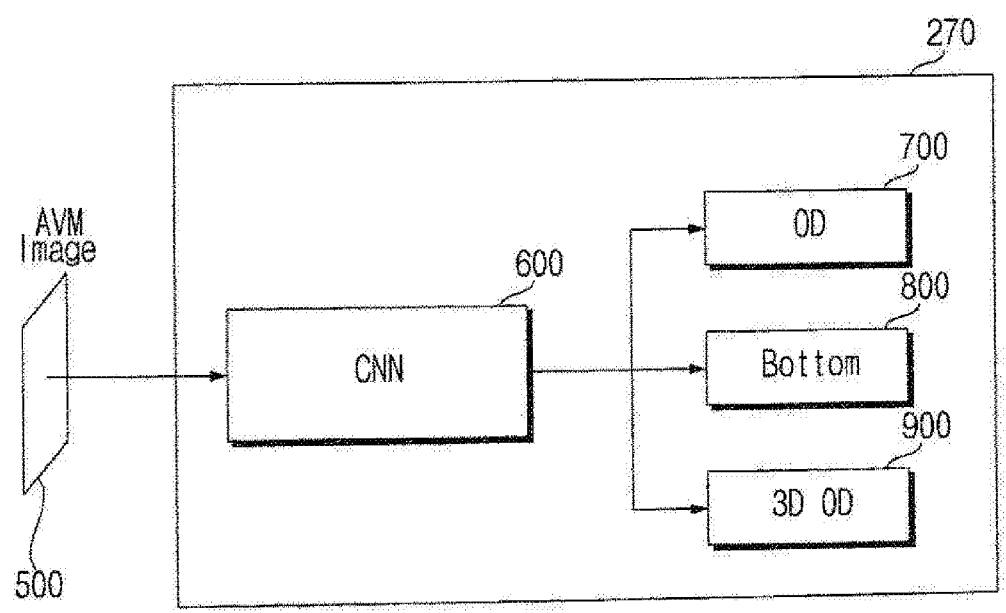
FIGS. 7 to 12 are diagrams for explanation of a vehicular electronic device according to an embodiment of the present invention.

FIG. 7 is a diagram for explanation of a vehicular electronic device according to an embodiment of the present invention.

Referring to FIG. 7, the processor 270 may include a CNN 600, an object detection network 700, a bottom network 800, and a 3D network 900.

The processor 270 may use an original image 500 as input of the CNN 600 without a preprocessing process. The processor 270 may use a common feature map that is output of the CNN as input of each of the object detection network 700, the bottom network 800, and the 3D network 900.

The processor 270 may acquire a 2D bounding box as output of the object detection network 700. The processor 270 may acquire a free space as output of the bottom network 800. The processor 270 may acquire a 3D cube as output of the 3D network 900.

The processor 270 may project a 2D bounding box, a free space, or a 3D cube to the image 500. In this case, the original image is used as input, and thus a post-processing process is not required.

Figure 8:
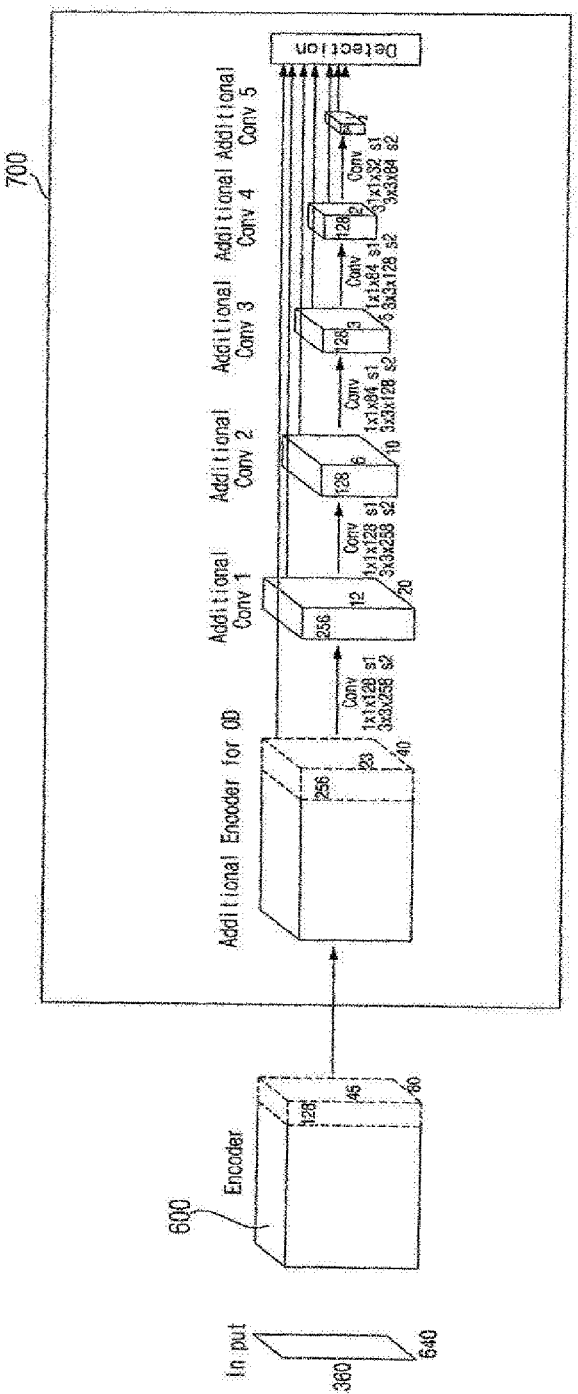

FIG. 8 is a diagram for explanation of an object detection network according to an embodiment of the present invention.

The object detection network 700 may output a 2D bounding box of an object and type information of the object based on Faster R-CNN. The object detection network 700 may also use a combination of Inception-ResNet-V2, MobileNet, and the like or may separately include the same.

Figure 9:
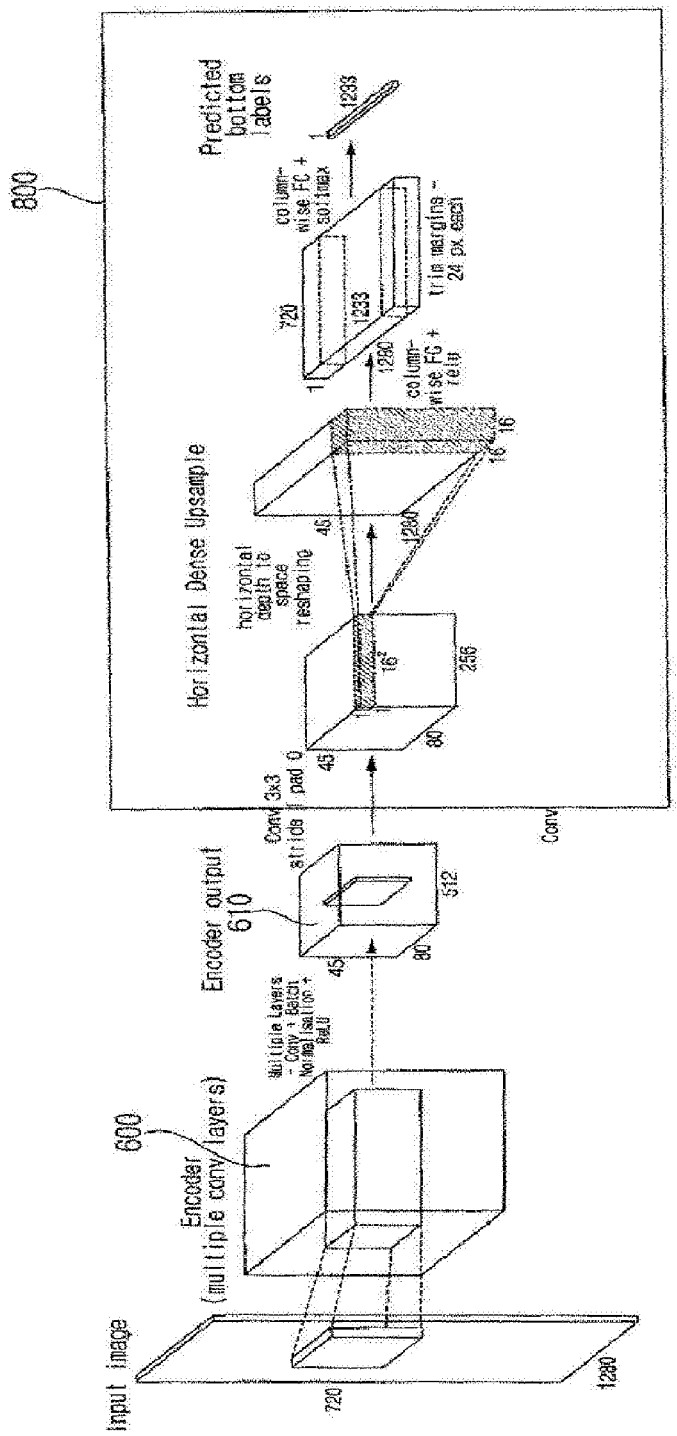

FIG. 9 is a diagram for explanation of a bottom network according to an embodiment of the present invention.

The bottom network 800 may be used to predict a free space, a curb, and a bottom point of an object. The bottom network 800 may use each vertical column of an image as input. For example, an input column used by the bottom network 800 may have a width 24, 23 pixels or greater of which overlap each other. Each column may be transmitted through the CNN 600 and may output a one-of-k label. Here, k may be a high dimension. The bottom network 800 may learn a method of classifying a position of a lower pixel of an object corresponding to a corresponding column. When all columns are combined, a free space, a curb, a bottom point of the object, or the like may be predicted. A column may be defined as a straight column region with an arbitrary size along a horizontal axis (x axis).

In processing of the bottom network 800, spaces between columns overlap each other, and thus 95% or greater of computation is redundant. In order to overcome the problem, the bottom network 800 may generate a feature map with the same resolution as an input image using a multiple upsampling layer in a common feature map as output of the CNN 600. The bottom network 800 may perform cropping on a hardcoded region of an image corresponding to a pixel column that is enlarged to an adjacent region of 23 pixels. A region of interest (ROI) for copping the upsampled feature map may have a width of 23 pixels and a height of 720 pixels. The ROI having a width of 23 pixels and a height of 720 pixels may be referred to as a window. The window may slide in a horizontal direction of an image. In order to predict the bottom point, crops may be adjusted to a size of a fixed length (e.g., 7×7) from an ROI pooling layer, and then may be classified as a one-of-k class. Here, k may correspond to a case with high accuracy as a height of an image.

When an ROI with a fixed position is used, computation may be repeated due to overlap between ROIs. In order to overcome the problem, the bottom network 800 may use a single shot method in a final classification layer. The bottom network 800 may replace a multiple upsampling layer with a single dense horizontal upsampling layer. When a stride is greater than 1, the common feature map may have resolution with a width of 16 and a height of 16 and may be reduced to 16 times the size of the original image. Compared with a case in which standard upsampling layers are used in both horizontal and vertical directions, the finally enhanced upsampling method may generate an output feature map, a width of which is increased 16 times the original image and a height of which is not changed.

The bottom network 800 may add a fully connected layer after a horizontal upsampling layer to make input of each column as a linear combination. A sub task of each column may automatically consider adjacently expressed pixels in a classified intermediate column to predict the lowermost bottom.

The bottom network 800 may estimate a bottom point of the object. The bottom network 800 may detect a bottom point in units of columns. Each column may be output as one bottom point. The bottom network 800 may analyze color, a borderline, and contrast of an image to detect a feature point of an input image and may generate a feature map to which the feature of the bottom point is applied.

Assuming that each column of an image has minimum one bottom point, the bottom network 800 may extract a feature map to which the feature of the bottom point of each column in an input image is applied and may extract a score (i.e. a probability of the bottom point) of the bottom point through the feature map. In this case, the bottom network 800 may classify the highest probability of the bottom point as a bottom point.

Figure 10:
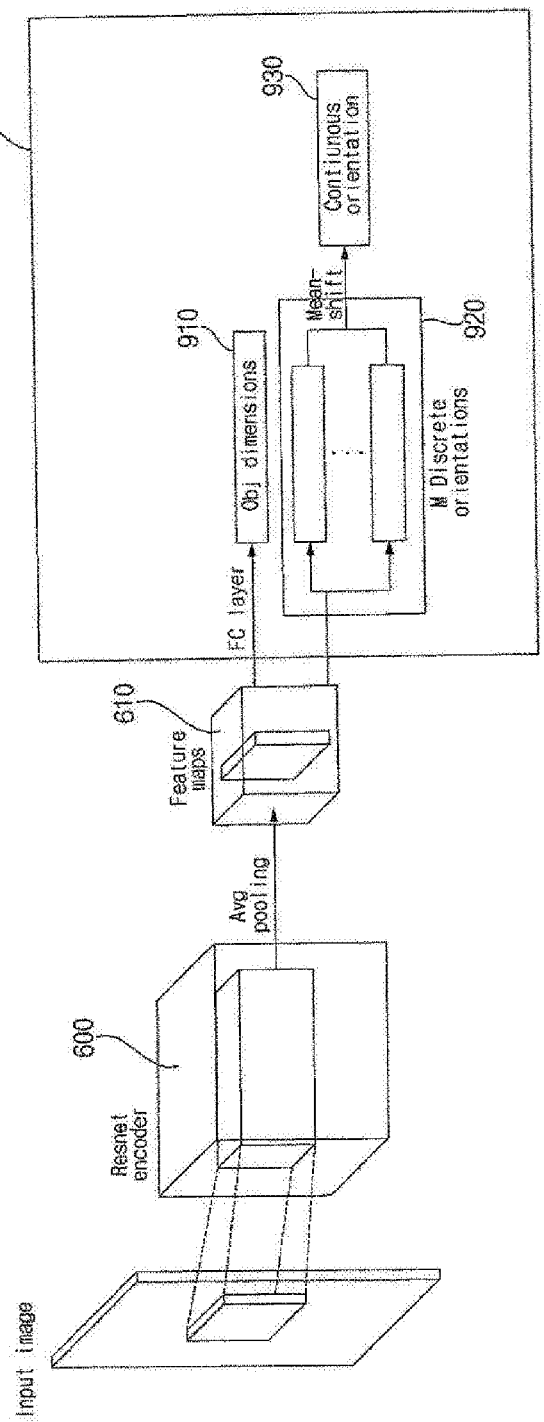

FIG. 10 is a diagram for explanation of a 3D network according to an embodiment of the present invention.

The 3D network 900 may separately use ResNet-101, DCNN, ImageNet, or the like or may use a combination thereof. The 3D network may include two branches for estimation of a dimension of an object and estimation of orientation of the object.

Figure 11:
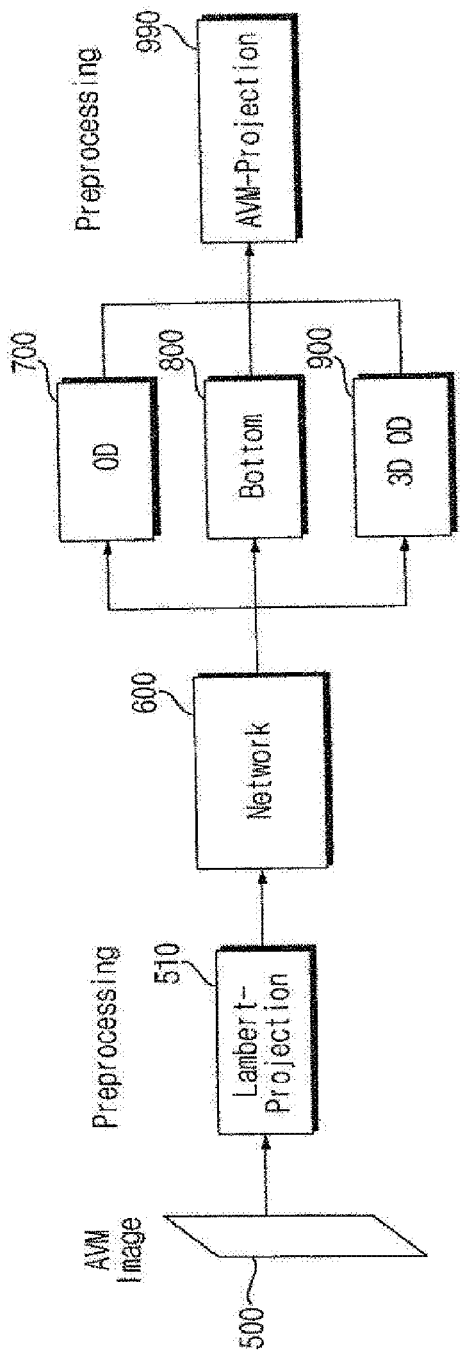
Figure 12:
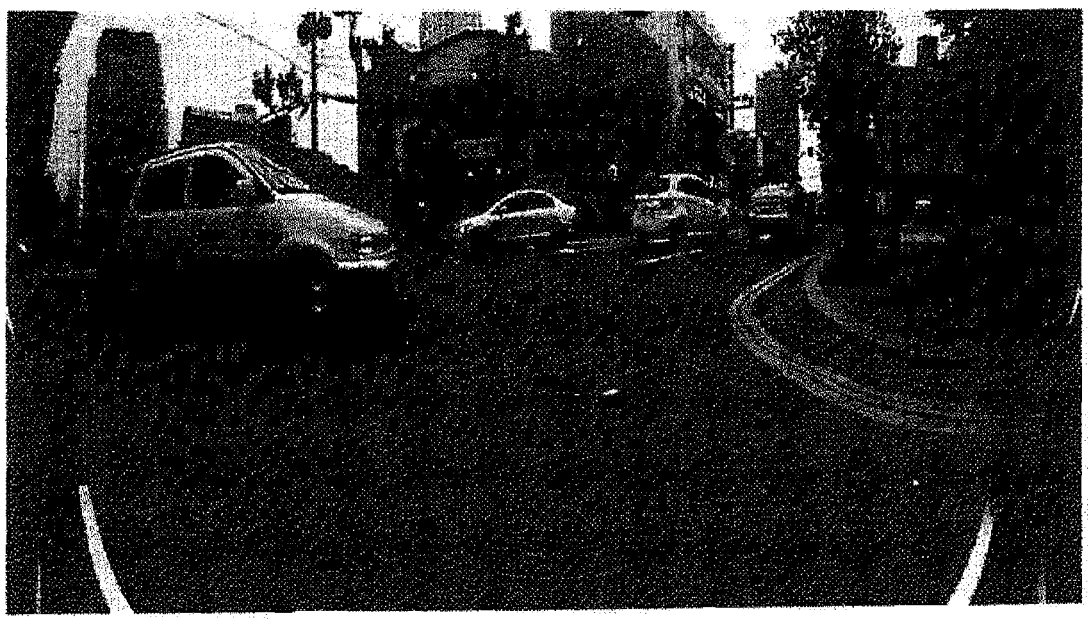

FIGS. 11 and 12 are diagrams for explanation of a vehicular electronic device according to an embodiment of the present invention.

The vehicular electronic device of FIG. 11 may perform a pre-processing process on the original image 500 and may use a pre-processed image 510 as input of a CNN differently from the vehicular electronic device of FIG. 7. The original image 500 may be a wide-angle image and may be distorted due to the characteristics of a camera. The processor 270 may perform lambert projection via pre-processing to acquire the pre-processed image 510. FIG. 12 illustrates an example of the image 510 on which lambert projection is performed via pre-processing.

A lambert projection function may be described as follows.

$$L_p(\vec{R}) = \begin{bmatrix} \lambda_l(\vec{R}) \\ \sin(\phi_l(\vec{R})) \end{bmatrix}, \qquad (1)$$

where $\lambda_l$ and $\phi_l$ are the latitude and longitude of a given ray $\vec{R}$:

$$\lambda_l(\vec{R}) = \arccos\left(\frac{\vec{R}_y \cdot [0\ 0\ 1]^T}{|\vec{R}_y|}\right) \quad (2)$$

$$\phi_l(\vec{R}) = \arccos\left(\frac{\vec{R}_y \cdot \vec{R}}{|\vec{R}_y| \cdot |\vec{R}|}\right) \quad (3)$$

Here, $\vec{R}_y$ is the three dimensional projection of $\vec{R}$ onto XoZ:

$$\vec{R}_y = \begin{bmatrix} 1 & 0 & 0 \\ 0 & 0 & 0 \\ 0 & 0 & 1 \end{bmatrix} \cdot \vec{R} \quad (4)$$

Given the fisheye projection $\vec{p}$ of a ray, we can compute $\vec{R}$ as follows:

$$\vec{R} = \begin{bmatrix} p_x \\ p_y \\ \frac{|\vec{p}|}{\tan(f_p^{-1}(|\vec{p}|))} \end{bmatrix} \quad (5)$$

In order to adjust for camera pitch, we rotated along oX with $-\alpha$:

$$\vec{R}' = \begin{bmatrix} 1 & 0 & 0 \\ 0 & \cos(-\alpha) & -\sin(-\alpha) \\ 0 & \sin(-\alpha) & \cos(-\alpha) \end{bmatrix} \vec{R} \quad (6)$$

Finally, the reprojected vector $\vec{q}$ was computed as:

$$\vec{q} = L_p(\vec{R}') \quad (7)$$

The processor 270 may use the pre-processed image 510 as input of the CNN 600. The processor 270 may use a common feature map that is output of the CNN, as input of each of the object detection network 700, the bottom network 800, and the 3D network 900

The processor 270 may acquire a 2D bounding box as output of the object detection network 700. The processor 270 may acquire a free space as output of the bottom network 800. The processor 270 may acquire a 3D cube as output of the 3D network 900.

The processor 270 may project a 2D bounding box, a free space, or a 3D cube to the image 500. In this case, the pre-processed image 510 is used as input, and thus a post-processing process may be required. The processor 270 may perform post-processing on the 2D bounding box, the free space, or the 3D cube. The processor 270 may project a result value in the lambert domain in the 2D bounding box, the free space, or the 3D cube and may project the result to the image 500.

The invention can also be embodied as computer readable code on a computer readable recording medium. The computer readable recording medium is any data storage device that can store data which can be thereafter read by a computer system. Examples of the computer readable recording medium include hard disk drive (HDD), solid state disk (SSD), silicon disk drive (SDD), ROM, RAM, CD-ROM, magnetic tapes, floppy disks, optical data storage devices, etc. and include a carrier wave (for example, a transmission over the Internet). In addition, the computer may include a processor or a controller. Accordingly, it will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

DESCRIPTION OF REFERENCE NUMERAL

10: vehicle
100: camera
200: vehicular electronic device

What is claimed:

1. An operation method of a vehicular electronic device, the method comprising:
   receiving at least one image data from at least one camera installed in a vehicle, by at least one processor;
   generating a common feature map based on the image data using a convolutional neural network (CNN), by the at least one processor;
   providing the common feature map to each of an object detection network, a bottom network, and a three-dimensional (3D) network, by the at least one processor; and
   extracting a second feature map for detecting a bottom of an object based on the common feature map using the bottom network, by the at least one processor.

2. The method of claim 1, wherein the CNN includes a plurality of convolutional layers and at least one pooling layer.

3. The method of claim 1, further comprising extracting a first feature map for detecting the object based on the common feature map using the object detection network, by the at least one processor.

4. The method of claim 3, further comprising:
   predicting a bounding box of the object based on the first feature map, by the at least one processor; and
   predicting a type of the object based on the first feature map, by the at least one processor.

5. The method of claim 1, further comprising:
   performing upsampling on the second feature map, by the at least one processor; and
   predicting a free space and a bottom point of the object based on the upsampled second feature map, by the at least one processor.

6. The method of claim 1, further comprising extracting a third feature map for estimating 3D information based on the common feature map using the 3D network, by the at least one processor.

7. The method of claim 6, further comprising acquiring a 3D dimension of the object by applying a fully connected layer to the third feature map, by the at least one processor.

8. The method of claim 6, further comprising:
   acquiring a plurality of discrete orientations of the object based on the third feature map, by the at least one processor; and
   acquiring continuous orientation of the object by performing mean shift on the plurality of discrete orientations, by the at least one processor.

9. The method of claim 1, further comprising estimating a first distance value with the object through a first output value of the object detection network and a second output value of the bottom network, by the at least one processor.

10. The method of claim 9, further comprising estimating a second distance value with the object through a third output value of the 3D network, by the at least one processor.

11. The method of claim 10, further comprising:
comparing the first distance value with the second distance value, by the at least one processor; and
providing the first distance value when a difference between the first distance value and the second distance value is equal to or greater than a threshold value, by the at least one processor.

12. The method of claim 11, wherein the comparing includes comparing a size of a two-dimensional (2D) bounding box of the object as a combination of the first output value and the second output value with a size of a 3D cube as an output value of a network for estimating 3D information and comparing the first distance value with the second distance value, by the at least one processor.

13. A vehicular electronic device comprising:
at least one interface unit configured to exchange a signal with at least one camera installed in a vehicle; and
at least one processor that is configured to receive at least one image data from the camera, to generate a common feature map based on the image data using a convolutional neural network (CNN), and to provide the common feature map to each of an object detection network, a bottom network, and a three-dimensional OD) network,
wherein the at least one processor is configured to extract a second feature map for detecting a bottom of an object based on the common feature map using the bottom network.

14. The vehicular electronic device of claim 13, wherein the CNN includes a plurality of convolutional layers and at least one pooling layer.

15. The vehicular electronic device of claim 13, wherein the at least one processor is configured to extract a first feature map for detecting the object based on the common feature map using the object detection network, to predict a bounding box of the object based on the first feature map, and to predict a type of the object based on the first feature map.

16. The vehicular electronic device of claim 13, wherein the at least one processor is configured to perform upsampling on the second feature map and to predict a free space and a bottom point of the object based on the upsampled second feature map.

17. The vehicular electronic device of claim 13, wherein the at least one processor is configured to extract a third feature map for estimating 3D information based on the common feature map using the 3D network, to acquire a 3D dimension of the object by applying a fully connected layer to the third feature map, to acquire a plurality of discrete orientations of the object based on the third feature map, and to acquire continuous orientation of the object by performing mean shift on the plurality of discrete orientations.

18. The vehicular electronic device of claim 13, wherein the at least one processor is configured to estimate a first distance value with the object through a first output value of the object detection network and a second output value of the bottom network, to estimate a second distance value with the object through a third output value of the 3D network, to compare the first distance value with the second distance value by comparing a size of a two-dimensional (2D) bounding box of the object as a combination of the first output value and the second output value with a size of a 3D cube as an output value of the 3D network, and to provide the first distance value when a difference between the first distance value and the second distance value is equal to or greater than a threshold value.

* * * * *